(No Model.)
E. J. BICKELL.
NUT LOCK.
No. 523,878.                    Patented July 31, 1894.
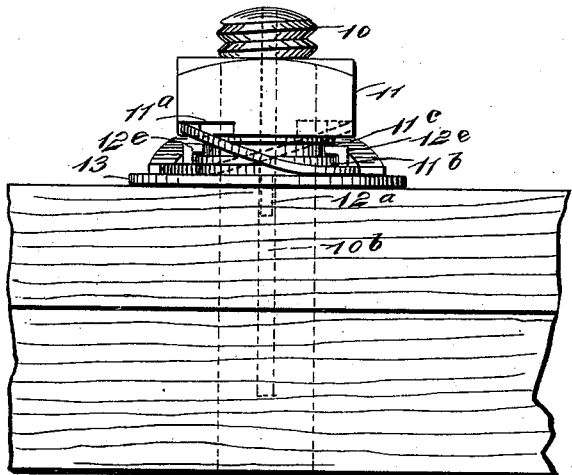
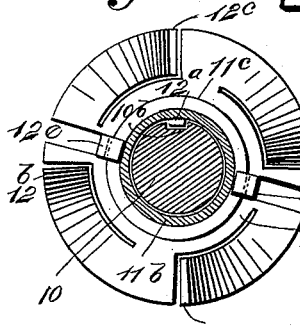
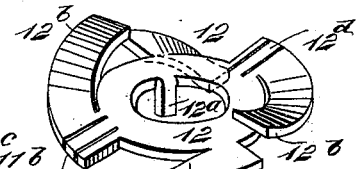
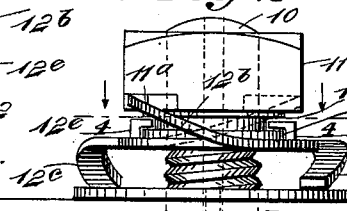
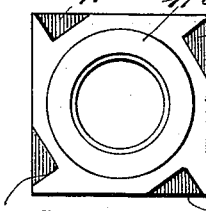
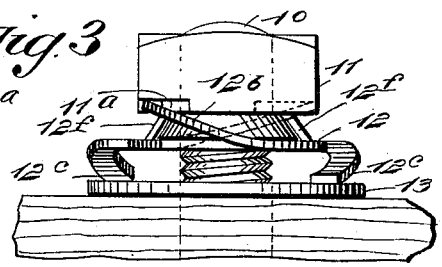
WITNESSES:
F. McArdle
Wm. P. Patton
INVENTOR
E. J. Bickell
BY Munn & Co
ATTORNEYS.
THE NORRIS PETERS CO., PHOTO-LITHO., WASHINGTON, D. C.

UNITED STATES PATENT OFFICE.

ELMER J. BICKELL, OF JERSEY SHORE, PENNSYLVANIA.

NUT-LOCK.

SPECIFICATION forming part of Letters Patent No. 523,878, dated July 31, 1894.

Application filed April 4, 1894. Serial No. 506,307. (No model.)

*To all whom it may concern:*

Be it known that I, ELMER J. BICKELL, of Jersey Shore, in the county of Lycoming and State of Pennsylvania, have invented a new and useful Improved Nut-Lock, of which the following is a full, clear, and exact description.

My invention relates to improvements in nut locks for screw bolts of various kinds, and has for its objects to provide a device of the type indicated, which will possess novel and superior features of construction that adapt the improvement to securely lock a nut on the threaded body of the bolt it is engaged with, when said bolt and nut are adjusted to clamp parts together, and furthermore, to effectively compensate for the expansion of a long bolt, or the shrinkage of wooden parts that the bolt, nut and the improvement hold in secured conditions.

To these ends my invention consists in the construction and combination of parts, as is hereinafter described and claimed.

Reference is to be had to the accompanying drawings, forming a part of this specification, in which similar figures of reference indicate corresponding parts in all the views shown.

Figure 1 is a side view of the improvement applied to a screw bolt and its nut, showing the nut lock engaged with the bolt body and nut thereon, so as to retain two pieces of material in a clamped condition, which is effected by the adjustment of the nut and the locking device to cause the latter to press on a washer and also interlock with the nut. Fig. 2 is a side view of the improvement on a bolt, and engaging the nut of said bolt, the latter being inserted through two pieces of material that are to be secured together by the bolt, nut, washer and nut-lock, these parts being shown as they appear before the nut is adjusted to firmly clamp the washer on the material, and thus compress the nut lock and draw the bolt head against the opposite side of the material that is to be clamped thereby. Fig. 3 is a side view of the nut lock, and nut with a washer on a bolt body in part, inserted through a piece of material, the view representing a slightly modified form of a portion of the improvement. Fig. 4 is a partly sectional plan view of the improvement and a transverse section of the bolt on the line 4—4 in Fig. 2. Fig. 5 is a detached perspective view of the main feature of the improvement, representing its form before its attachment to a nut; and Fig. 6 is a detached reverse plan view of the nut prepared to receive the improved locking device.

The screw bolt 10 may be of any length, and have a square or other shaped head for convenience, said head 10$^a$ is represented as having four sides.

The nut 11 is four cornered, and as indicated in Figs. 2 and 6, in preferred form has a V-shaped notch 11$^a$ formed near each corner, and is also furnished with an integral cylindric projection 11$^b$ of a less diameter than the breadth of the nut body, which portion extends below the notched surface of the four corners of the nut, and has a circumferential groove 11$^c$ produced in it near the corners of the nut, as indicated in Figs. 2 and 4.

The bolt 10 has a longitudinal flat bottomed groove 10$^b$ formed in its threaded portion of a suitable width, and a depth about equal with that of the thread, as shown clearly in Fig. 4.

The nut lock proper consists of an annular metallic plate 12 of proper thickness for efficient service and possessing elasticity, said plate having its outer diameter proportioned to suit the size of the bolt and nut it is to engage with, its central perforation being of such a relative size as will allow the locking plate to slide freely over bolt threads, and on the margin of said perforation an integral key 12$^a$ is formed which is bent at a right angle to the flat central portion of said plate, said key being adapted to freely slide in the groove 10$^b$. Two pairs of integral spring fingers are produced on the locking plate and are located at the periphery, these being opposite in pairs. The fingers 12$^b$ are cut free from the plate at one end of each, and on a line concentric with the periphery of the annular plate at such an equal distance from the latter, as will afford a proper breadth for said fingers, which are bent on an incline of equal degree in an upward direction, their free ends being projected in opposite directions. The other pair of spring fingers 12$^c$ are formed in a similar manner as the fingers 12$^b$, but are bent to incline oppositely and downwardly, these fingers intervening the fingers 12ᵇ, as shown in the drawings. At opposite points on the plate 12 two radial leaves 12ᵈ are formed by inwardly slitting the material from the outer edge, two of said spaced slits being needed to produce each leaf, the latter being flat when thus formed as shown in Fig. 5.

To arrange the plate 12 for service as a nut lock the leaves 12ᵈ are upwardly bent at a right angle to the flat portion of said plate that remains, and which in service forms a seat for the cylindrical lower end of the nut 11, which will adapt the leaves to loosely engage the circumferential wall of the cylindric position mentioned, as shown at 12ᵉ in Figs. 1, 2 and 4. The leaves 12ᵈ are now bent at their upper or free ends to project these parts into the groove 11ᶜ of the nut 11, thereby loosely securing the nut and its locking plate 12, together.

It is essential that the formation of the fingers 12ᵇ, be such as will allow their free ends to slide over the corners of the nut 11, when the latter is screwed upon the bolt thread and yield to the pressure of the nut as it is tightened while these ends of the spring fingers will lie in the notches 11ᵃ if the latter in opposite pairs are located above said spring ends, so that an attempt to relax the nut will be prevented by the impinge of the spring terminals on the shoulders of the engaged notches.

The downwardly bent spring fingers 12ᶜ are seated with their free ends on the washer 13, that is strung on the bolt and engages the top surface of material penetrated by said bolt, they being sufficiently elastic to yield without breaking as the nut is drawn down to firmly secure it in place on the bolt body. The washer 13 may be dispensed with if the material engaged by the bolt is metal or other hard substance.

The provision of the spring fingers 12ᶜ is of advantage, as they serve to take up the looseness resulting from the longitudinal expansion of a long bolt body, and also compensate for the shrinkage of wooden material that may be secured by the bolts that are furnished with the improvement, the resilience of said fingers co-acting with the upwardly inclined fingers 12ᵇ to enforce an interlock of the latter with the notches of the nut, when the bolt is loosened temporarily by its expansion in the summer, or when excessive dryness shrinks the timbers that may be fastened with bolts, nuts, washers and the improved nut-lock hereinbefore described.

The device shown in Fig. 3 is essentially similar to that represented in the other views of the drawings, the only change consisting in the formation of a coniform depending end on the nut in lieu of the cylindrical part, this depending portion resulting from V-grooving the nut below its square body, thereby enabling the locking together of the plate 12, with the nut by inwardly bending the leaves of the locking piece at such an incline as will permit them to loosely embrace the coniform portion of the nut as shown at 12ᶠ thereby loosely securing the nut and locking piece together and allowing the nut to be screwed on the bolt.

It will be seen that the engagement of the depending key 12ᵃ with the longitudinal groove of the bolt will prevent the plate 12 from rotating with the nut 11 which insures the effective operation of the improvement.

Having thus fully described my invention, I claim as new and desire to secure by Letters Patent—

1. A nut lock, comprising an aperture plate provided with a key projecting from the margin of the aperture and at right angles to the plate, leaves for loosely securing the plate to a nut to permit the nut to turn on the said plate, and two pairs of locking fingers, the pairs being opposite each other, one pair projecting upward and the other downward, substantially as described.

2. In a nut lock, the combination of an apertured plate provided at its periphery with two pairs of locking fingers, one pair projecting upward and the other downward, and a nut secured to the plate to turn thereon, substantially as described.

3. In a nut lock, the combination of a nut having a grooved projection on its under side, and a locking plate provided with leaves projecting into the groove of the said projection, and with locking fingers, substantially as described.

4. In a nut lock, the combination of a nut having its corners notched and provided with a grooved projection on its under side, and a locking plate provided with leaves projecting into the groove of the projection and with two pairs of fingers, one pair of which projects upward and the other downward, substantially as described.

5. The combination with a longitudinally grooved bolt, and a nut having a circumferential groove near its lower side, of a locking piece, comprising an annular plate having an integral key formed at the edge of its center hole, and fitting in the groove of the bolt and two sets of inclined spring fingers, one set projecting up to interlock key notches at corners of the nut, and the other set extending down to be seated on material penetrated by the bolt; substantially as described.

ELMER J. BICKELL.

Witnesses:
JNO. E. POTTER,
J. F. CAROTHERS.